April 4, 1967 G. R. ECKHARDT 3,312,037
ZIPPER PACKAGING MACHINE
Filed Feb. 12, 1965 7 Sheets-Sheet 1

INVENTOR.
GEORGE R. ECKHARDT
BY
Burgess, Ryan & Hicks
ATTORNEYS

April 4, 1967 G. R. ECKHARDT 3,312,037
ZIPPER PACKAGING MACHINE

Filed Feb. 12, 1965 7 Sheets-Sheet 5

INVENTOR.
GEORGE R. ECKHARDT
BY
Burgess, Ryan & Hicks
ATTORNEYS

United States Patent Office 3,312,037
Patented Apr. 4, 1967

3,312,037
ZIPPER PACKAGING MACHINE
George R. Eckhardt, Fords-Edison Township, Middlesex County, N.J., assignor to Coats & Clark Inc., New York, N.Y., a corporation of Delaware
Filed Feb. 12, 1965, Ser. No. 432,122
11 Claims. (Cl. 53—188)

This invention relates to a machine for packaging zippers.

A zipper comprises two lengths of fabric tape, each tape having fastening elements either in the form of teeth or of a helical coil, the elements on one tape intermeshing with those on the other. Zippers are sold in a plurality of lengths, with the teeth meshed and, usually, an end stop and slider in place at opposite ends thereof.

It is desirable that the zipper when exposed for sale, be completely enclosed in a protecting package, to prevent soiling or damage. The package should afford a view of the zipper so that the prospective buyer can see the size and color of the product. The package should support the enclosed zipper to avoid dislocation thereof should the package be dropped or jarred. Finally, some provision should be made for including written instructions and diagrams to guide the buyer in fastening the zipper in place in a garment. It is the object of the invention to supply a package which fulfills the criteria set forth above.

It is a further object of the invention to provide a packaging machine which will speed the assembly of the zipper with the package. This machine should present an insert card, staple the zipper to the insert card, position an envelope, open the envelope mouth, place the insert card and zipper in the envelope, and close the envelope.

Further objects of the invention will be obvious from the description below, considered in connection with the accompanying drawings, in which

FIGS. 1–5 show progressive steps in the assembly of a zipper within its package, no machine elements being shown.

Figures 1, 2, 3, 4, 5:
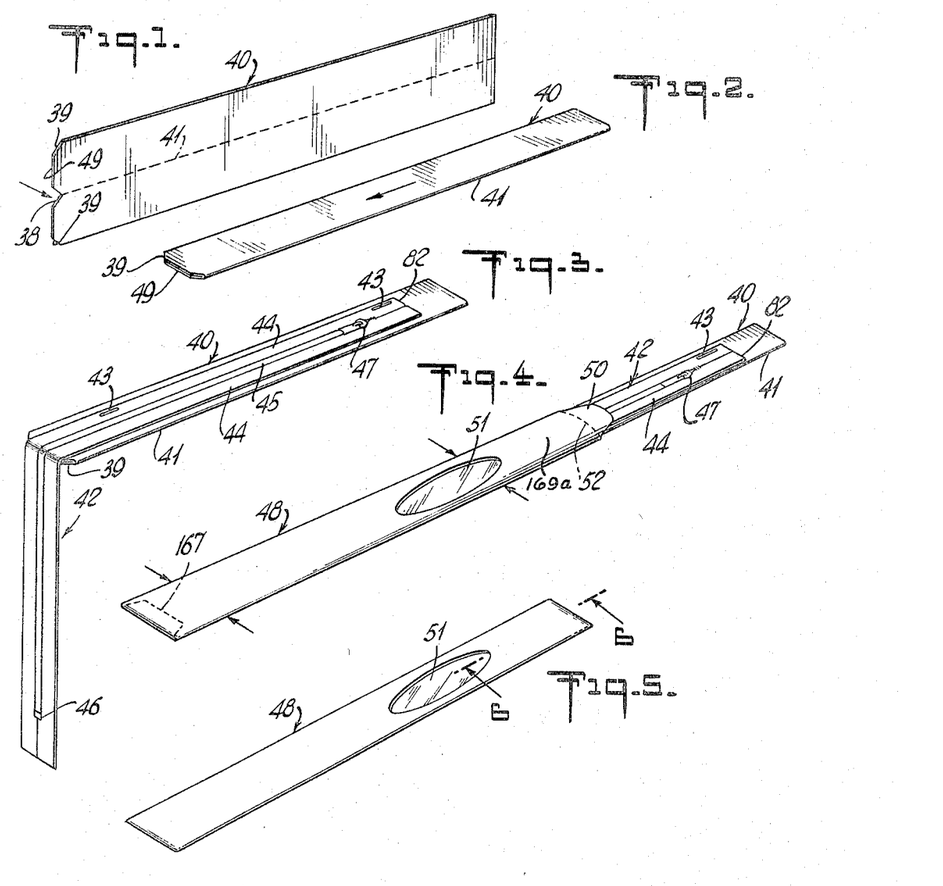
FIG. 1 is a perspective view of an unfolded insert card.
FIG. 2 is a perspective view of the insert card of FIG. 1 folded longitudinally.
FIG. 3 is a perspective view of the folded insert card with a zipper stapled thereto.
FIG. 4 is a perspective view of the assembled zipper and insert card partially inserted in an envelope.
FIG. 5 is a perspective view of the envelope of FIG. 4 with the zipper and insert card therein and the envelope flap closed.
Figure 6:
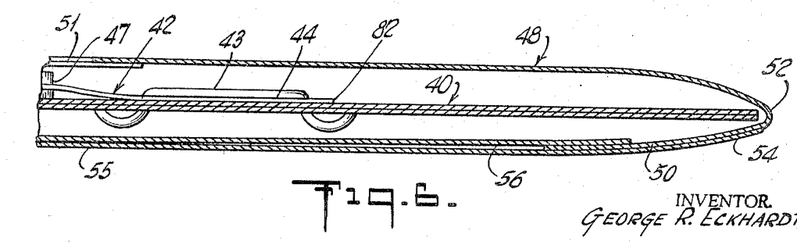
FIG. 6 is an enlarged cross-section taken on plane 6—6 of FIG. 5.

FIG. 1 shows a rectangular insert card 40, which may be made of cardboard. The insert card is scored or perforated along midline 41 and may bear printed diagrams and sewing instructions. A notch 38 is cut into the leading end of the insert card, the apex of the notch lying on the midline. The corners 39, 39 of the leading end are chamfered. FIG. 2 shows the insert card after it has been folded over along the midline. Notch 38 and chamfers 39, 39 give the leading end of the folded insert card a taper useful in facilitating loading of the insert card into an envelope. In FIG. 3 the insert card is shown with zipper 42 attached to it by staples 43, 43. The zipper comprises tapes 44, 44, interlocking elements 45, bottom stop 46, and slider 47. As shown in FIG. 3, a segment of the zipper hangs down over the leading end 49 of the insert card. This segment is bent back under the insert card as the insert card is inserted into the envelope 48 of FIG. 4, the leading end 49 being inserted first. The length of the insert card is less than that of the envelope by an amount sufficient to accommodate the extra length added to the leading end 49 by the bend of the zipper. A transparent plastic flexible film window 51 is provided in the envelope to allow the zipper to be seen without opening the envelope. This window may be formed of a polyethylene terephthalate resin, such as Mylar. As shown in FIG. 5, the envelope mouth flap 50 of FIG. 4 has been tucked in. The folding under of the mouth flap is facilitated by a scored or perforated fold line 52. As may best be seen in FIGS. 6 and 26, a corner 53 of the mouth flap is tucked under a loose corner 54 of the envelope body. The envelope is of flattened tubular construction, having a glued overlapping seam 55 extending longitudinally for most of its length and an ordinary end flap 167 at its inner end. The overlap seam 55 is cut away, and glue omitted, along section 56. The flap 50 is not glued in place after being folded under corner 54.

Because the flap 50 is not glued, the package may easily be opened and re-closed. Potential buyers can thus remove and replace the zipper without destroying the integrity of the package. The exposed portion 57 of the mouth flap affords a purchase for the finger in opening the flap.

FIGS. 7–25 show details of the construction and operation of a packaging machine designed to place zippers in the package described above. As may best be seen in FIG. 9, the insert cards 40 are stacked in trough 58. The bottom surface 59 of this trough is slanted so that the stacked insert cards drop to the left as seen in FIG. 9, sliding downward until the insert card at the end of the stack rests against a reciprocable feed block 60. The insert cards are retained on edge and urged downward in the trough by weight 61, of triangular cross-section, which also slides freely in the trough under the influence of gravity.

When a foot switch (not shown) is depressed by the operator of the machine, the machine goes through a loading cycle and a reciprocation mechanism causes the feed block to move downward and then back up to the position shown in FIG. 9. Guideways 169b, 169b guide the vertical slide 170, which carries the feed block. The reciprocation mechanism is not shown but comprises a cam which transmits motion to the vertical slide by means of bell cranks and pushrods. When the feed block drops, the insert card at the end of the stack is pushed downward by ledge 61 until it is grasped between counter-rotating rubber rollers 62, 62. These feed the insert card down to the lower position (shown in dashed lines in FIG. 9) where it rests on insert card support 63.

The operation of the foot switch which begins a feed cycle causes feed knife 64 to reciprocate horizontally leftward from the position shown in FIG. 9. This motion is initiated by a rotating cam 79a. The feed knife strikes the insert card at midline 41, and thrusts the midline between counter-rotating rollers 65. These crease the insert card along the midline, thus completing the folding action begun by the feed knife, and force the folded insert card to the left until the fold strikes wall 66 of stationary slideway 67. In this position the insert card is horizontal and partially rests on top surface 68 of slide 69. The folded insert card is indicated by dashed lines in FIGS. 7, 8 and 9 and is shown at 40' in FIG. 8.

Figure 8:
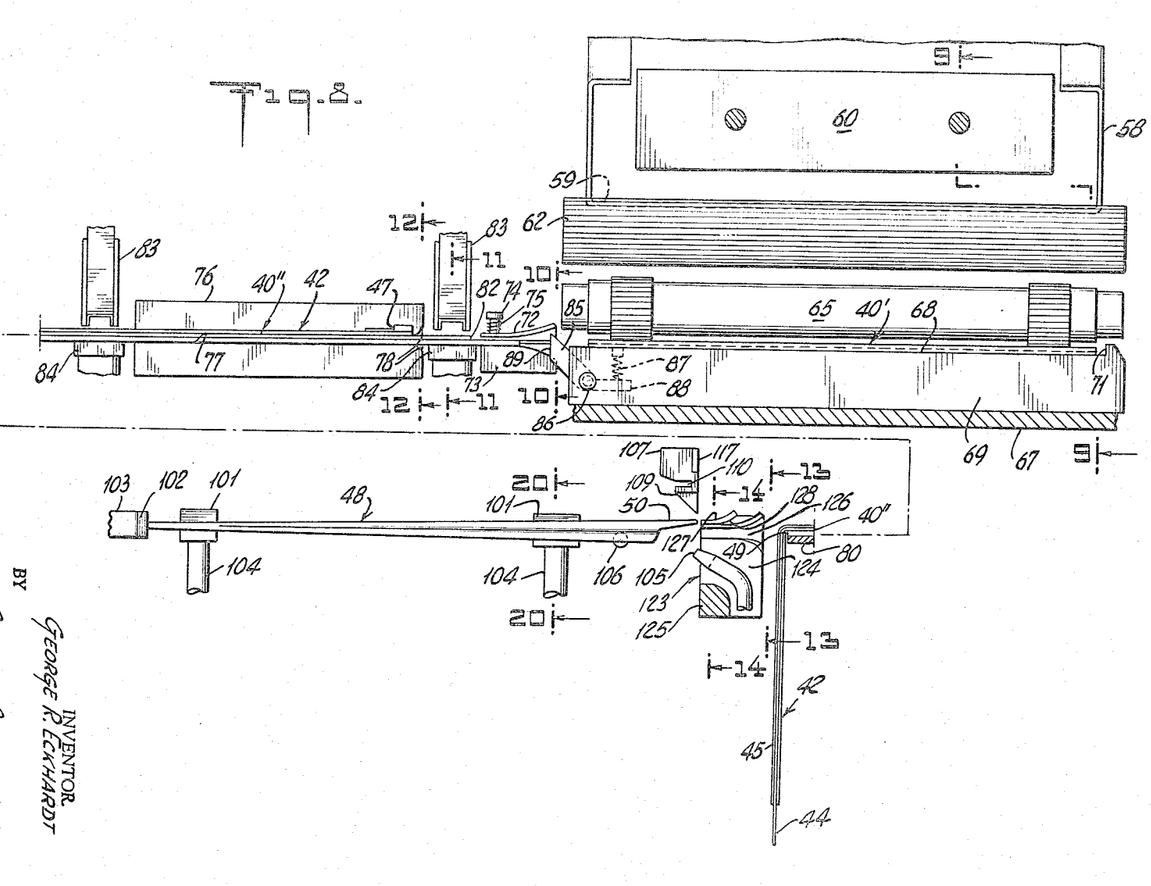
FIG. 8 is a side view corresponding to FIG. 7.
Figures 9, 10:
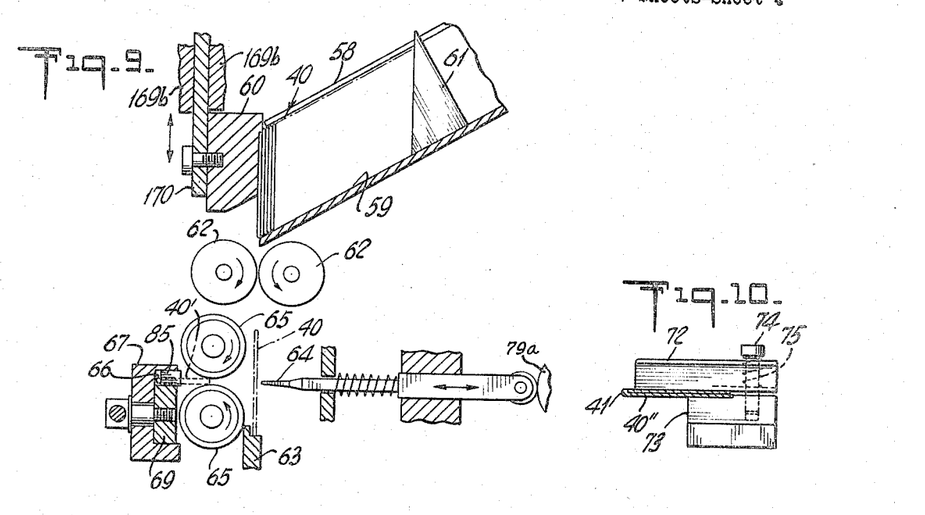
FIG. 9 is a partial cross-sectional view of an insert card feed mechanism taken on plane 9—9 of FIG. 8.
FIG. 10 is a partial cross-sectional view of an insert card guide taken on plane 10—10 of FIG. 8.

When the machine is activated by the operator, slide 69 reciprocates to the left, as seen in FIG. 8. This motion may be effected by a quick-return mechanism of the type familiar in shaping machines. Such leftward motion serves to advance a folded insert card on the top surface of the slide to the position 40''. The slide ledge 71 contacts the end of the insert card and forces it to advance with the slide. During this advance motion the leading end of the folded insert card enters the flared mouth of a guide comprised of upper guide plate 72 and lower guide plate 73. As may best be seen in FIG. 10, these guide plates form a channel which grips the folded insert card 40''. The amount of gripping force may be varied by means of adjusting screw 74 which passes through an oversize hole in the upper guide plate and into a tapped hole in the lower guide plate. A helical spring 75 surrounds the adjusting screw, one end bearing against the head thereof and the other pressing down on the upper guide plate. By screwing down the adjusting screw the guide plates may be urged toward each other and the insert cards may be more firmly held during the stapling operation to be described below.

Figure 12:
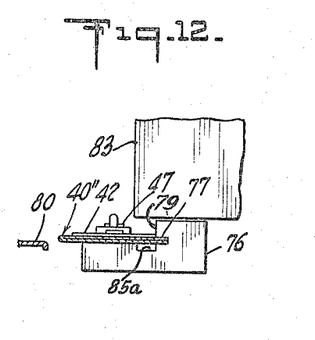
FIG. 12 is a partial cross-sectional view of an insert card track taken on plane 12—12 of FIG. 8.
Figure 13:
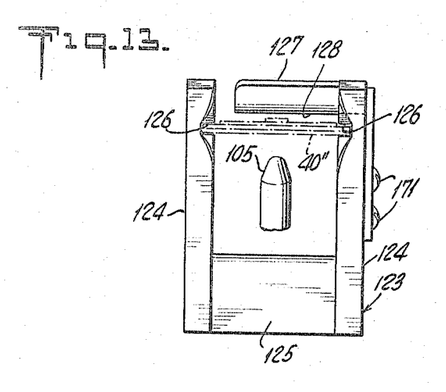
FIG. 13 is a partial cross-sectional view of an insert card guide taken on plane 13—13 of FIG. 8.
Figure 14:
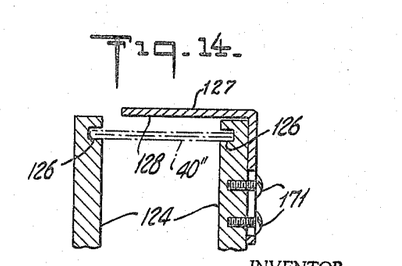
FIG. 14 is a partial cross-sectional view of an insert card guide taken on plane 14—14 of FIG. 8.

When in the position 40'', the insert card is gripped not only by the upper and lower guide plates just described, but by grooved guide block 76 (see FIGS. 8 and 12). This guide block underlies the insert card and supports it from beneath. The edge of the insert card is retained in shallow groove 77 of the guide block, formed by over-hanging portion 79 thereof. The end of the groove 77 is slightly flared at 78 to insure proper entry of the leading end of the insert card.

Figure 11:
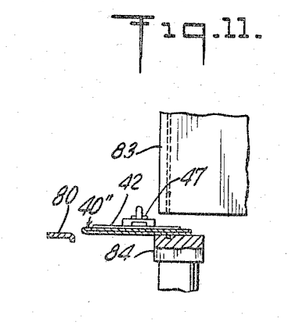
FIG. 11 is a partial cross-sectional view of a stapling mechanism taken on plane 11—11 of FIG. 8.

Abutting the guide block 76 is a tabletop 80. The tabletop is so located that it is in alinement with upper surface of the insert card 40''. The machine operator sits to the left of the machine as seen in FIGS. 11 and 12, and keeps a pile of loose zippers before her on the tabletop. As each insert card reaches position 40'', she slides a zipper 42 across the tabltop onto the insert card. As may best be seen in FIG. 12, the zipper is pushed against the guide block 76, which thus locates it accurately with respect to the sides of the insert card. The upper end 82 of the zipper is located close to the upper guide plate. As may be seen in FIG. 8, the tabletop 80 extends only as far as the leading end of the insert card, and the lower ends of zippers which are longer than the insert card are allowed to dangle over the tabletop edge.

Close to each end of the insert card in position 40'' there is located an air-operated wire stitch machine 83, adapted to staple the zipper tape to the insert card. The anvils 84 of the wire stitch machines underlie the folded insert card. Guide block 76 is provided with a clearance groove 85a alined with the staple anvils so that the staple ends, which project through the insert card, will not snag as the assembled insert card and zipper are advanced in the manner to be described below. Like the other elements of the machine, the stitch machines operate once each time the operator depresses a foot switch. The insert card and zipper immediately following the stapling step are in the position shown in FIG. 3.

As has already been described, each activation of the foot switch causes the slide 69 to reciprocate to the left as seen in FIG. 8. This action not only advances a new insert card to a position beneath the wire stitch machines, but also pushes the previous insert card, now stapled to a zipper, into an envelope 48. The pushing contact is exerted by pawl 85 which is pivotally connected to slide 69 by pin 86. The pawl is gently biased into the raised position shown in FIG. 8 by helical pawl spring 87 which presses downward on pawl arm 88. When the slide advances to the left, as seen in FIG. 8, the front face 89 of the pawl contacts the trailing edge of the insert card in position 40'' and pushes it to the left into envelope 48. During the return stroke of the slide, the pawl rotates counterclockwise (as seen in FIG. 8) about pin 86 and its outer end rides under the insert card which was advanced into position 40'' by the preceding advance stroke.

Figure 7:
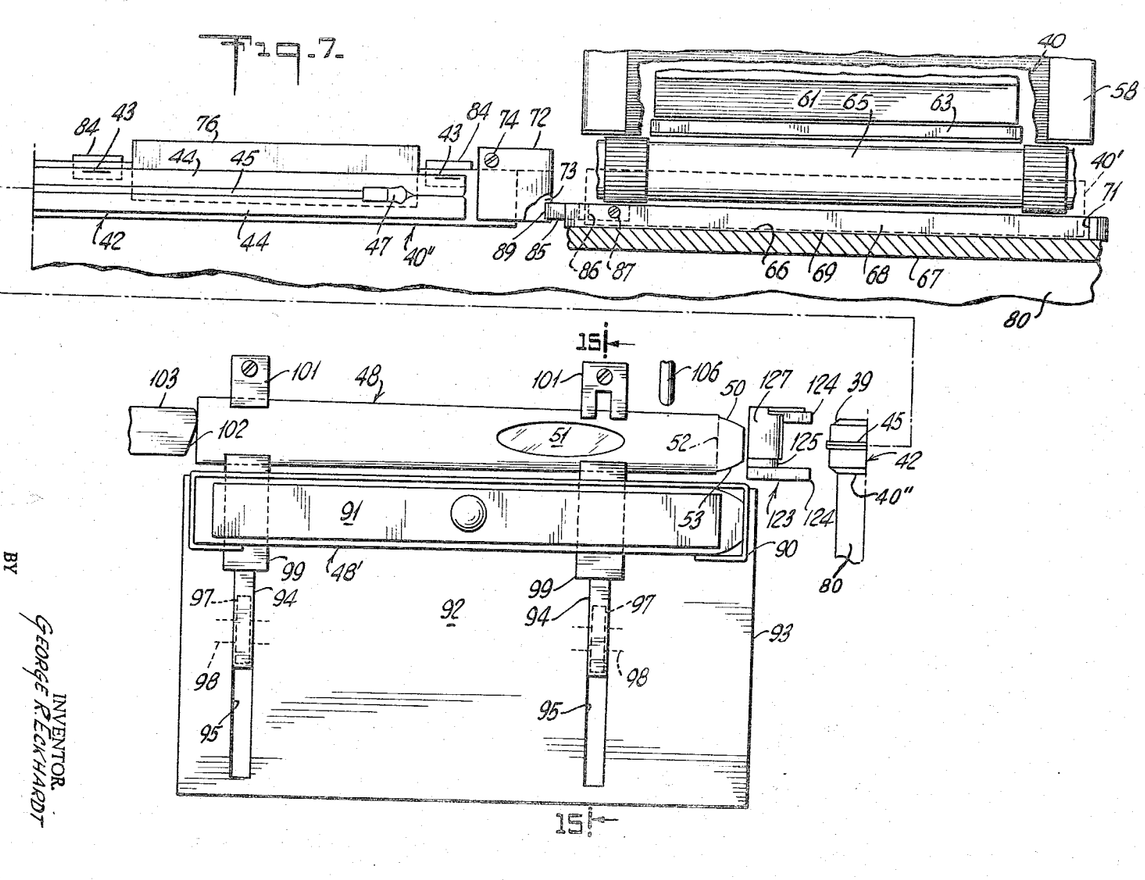
FIG. 7 is a plan view of a portion of a zipper packaging machine.
Figures 15, 20, 21, 22, 23:
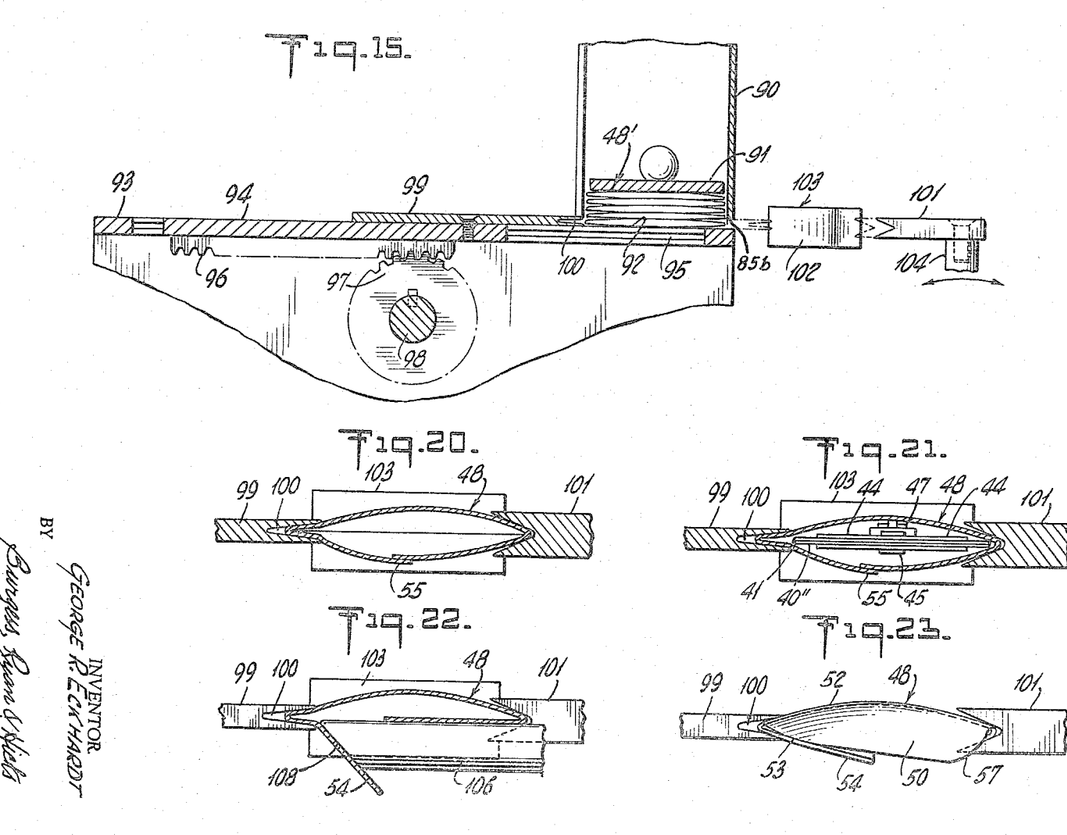
FIG. 15 is a partial cross-section of an envelope opening mechanism taken on plane 15—15 of FIG. 7.
FIGS. 20–22 are partial cross-sectional views taken on plane 20—20 of FIG. 8, showing successive stages in the process of opening, loading, and closing the envelope by the machine.
FIG. 23 is an end view of the filled envelope.
Figure 16:
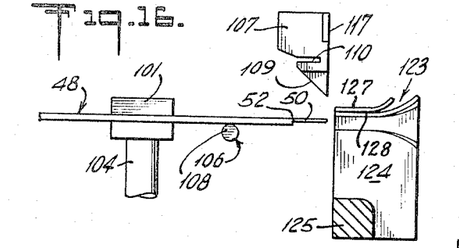
FIGS. 16–19 are partial cross-sectional views of a flap folder mechanism showing successive stages in the process of opening an envelope, inserting a zipper and card insert, and folding the envelope flap shut.

FIGS. 7, 8 and 15 show the mechanism which advances and opens an envelope for the reception of the zipper and insert card. The empty envelopes 48' are stacked vertically within an envelope magazine 90. A follower weight 91 presses them downward so that the bottom envelope rests on the top surface 92 of table 93. Inset into the table 93 are envelope advance slides 94 mounted in tongue-and-groove slideways 95. Each envelope advance slide carries a rack 96 on its underside meshed with a pinion 97 keyed to rotatable shaft 98. Each envelope advance slide also carries on its upper surface an envelope advancing plate 99. The envelope advancing plates have a deep groove 100 in their edge adjacent the pile of stacked envelopes. When the moment arrives to advance an envelope for filling, the envelope advance slides are moved to the right, as seen in FIG. 15, until the envelope advancing plates move to the position indicated by dashed lines in that figure. Rotation of shaft 98 effects their movement. During this motion the edge of the lowermost envelope in the stack enters the grooves 100 and jams therein sufficiently so that the envelope may be moved outward from under the stack and into contact with the opener heads 101. During this outward motion the envelope is axially alined by alinement cam surface 102 on alinement block 103 (see FIG. 7) and passes beneath lip 85b of the magazine (FIG. 15), which holds back the next envelope in the stack.

The opener heads are mounted on rods 104 which swing through a short arc under the influence of a cam (not shown). The timing of the swing is adjusted so that the envelope after advancing to touch the opener heads, is then squeezed open when the opener heads move inward to the position shown in dotted lines in FIG. 15. The envelope in this squeezed state is shown in FIGS. 20 to 23. Proper opening of the envelope is further assured by the action of an air blast from nozzle 105, which strikes the underside of flap 50 and is deflected thereby into the envelope, which balloons open under the increased internal air pressure. This air blast is applied during the squeezing of the envelope by the opener heads and continues until the leading end of the insert card has entered the envelope. The air blast insures that the upper and lower envelope surfaces will bow away from each other rather than both bowing in the same direction.

The motion of the insert card with the attached zipper into the envelope is controlled by guide frame 123. The guide frame is comprised of vertical side pieces 124, 124 joined by a connecting bridge 125. The side pieces have opposed horizontal guide grooves 126 spaced to guide the edges of the insert card as it passes through the guide frame. The entrance to the guide grooves is flared to insure proper centering of the insert card.

Depressor plate 127 is adjustably mounted on one side piece by means of screws 171. The depressor plate can be set so that the envelope flap is above the curved bottom surface 128 of the depressor plate when the envelope is held open as in FIG. 17. With the depressor plate so positioned, the zipper will not snag on the envelope flap as it is pushed into the envelope.

While the insert card with the zipper attached is pushed into the envelope by pawl 85, any excess zipper which hangs over the leading end of the insert card is doubled back beneath the insert card by the connecting bridge 125. FIG. 20 shows the cross-section of the opened but empty envelope. FIG. 21 shows the same cross-section after the zipper and insert card have been inserted.

Figure 17:
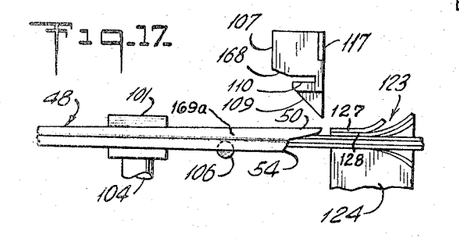
Figure 18:
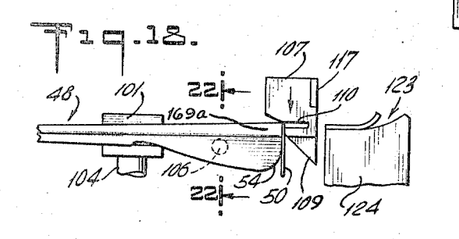
Figure 19:
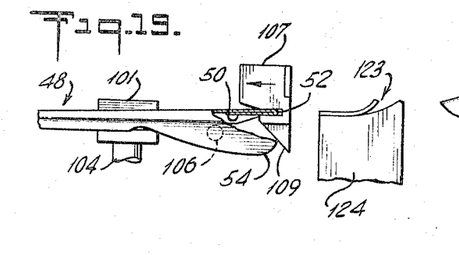
Figures 25, 26:
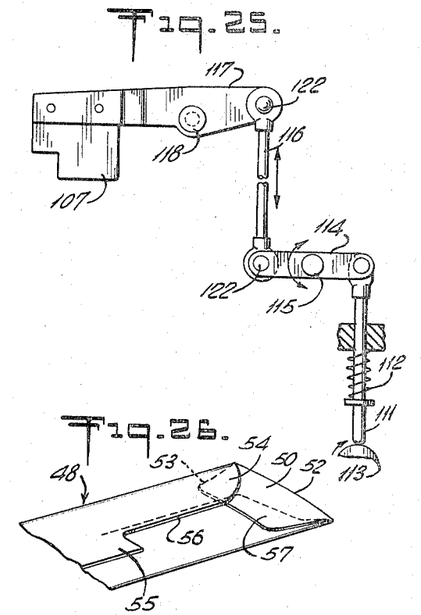
FIG. 26 is a partial perspective view of the closed flap of the envelope of FIG. 5.

FIGS. 17–19 discloses the various steps involved in closing the flap on the envelope. Closure is effected by means of spreading finger 106 and flap tucker 107. When the envelope is filled, the bulk of the contents, together with the squeezing action of the opener heads 101, causes the corner 54 of the envelope body to drop away from the envelope slightly. This corner is then contacted by the spreading finger 106 which moves from the inactive position shown in FIG. 7, to the extended position of FIG. 22. During this movement slanted face 108 bends down corner 54 as shown in FIGS. 18 and 22. While the spreading finger is opening this corner, flap tucker 107 descends from the raised position of FIG. 17 to the lower position of FIG. 18. This motion bends flap 50 downward as slanted surface 109 contacts the flap. Having reached the position shown in FIG. 18, the flap tucker then moves horizontally toward the envelope to the position of FIG. 19. A deep horizontal notch 110 in the flap tucker receives the edge of the envelope and the flap, bending the flap into a horizontal position. The guide surface 168 descends on the upper face 169a of the envelope during the vertical motion and insures that the edge of the envelope enters the horizontal notch during the following horizontal motion. When the spreading finger is then moved away from the envelope into the inactive position, the corner 54 of the envelope closes on the flap and keeps it in place, as shown in FIGS. 23 and 26. The flap tucker then moves back and up to the raised position of FIG. 17.

Figure 24:
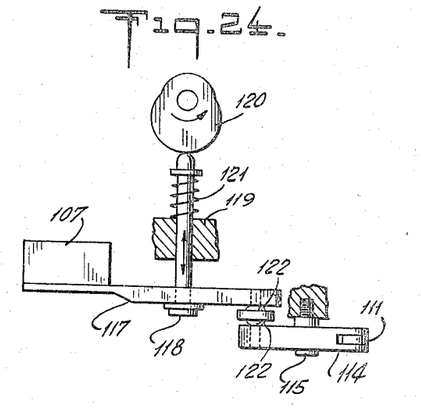
FIGS. 24 and 25 are respectively plan and end views of a flap tucker mechanism.

The motions of the flap tucker are achieved by the machine elements shown in FIGS. 24 and 25. The vertical motion of the flap tucker results when pushrod 111, urged by helical spring 112, drops as a low point on rotating cam 113 is reached. Clockwise rotation of link 114 (as seen in FIG. 25) about pivot 115 results, raising connecting link 116. This motion in turn causes flap tucker arm 117 to rotate counterclockwise about pivot 118 and lowers the flap tucker.

Horizontal movement of the flap tucker is effected by means of the mechanism illustrated in FIG. 24. Pivot 118 is axially slidable in fixed guide 119. It is biased into contact with rotatable cam 120 by helical spring 121. When the low spot on the cam is reached the flap tucker moves horizontally. Ball-and-socket joints 122 at opposite ends of link 116 allow the necessary flexibility to accommodate the horizontal motion of the flap tucker arm.

When the flap has been tucked as described above, the opener head 101 moves to the right as seen in FIG. 15 and the completed package falls from the machine.

Figures 27, 28, 29:
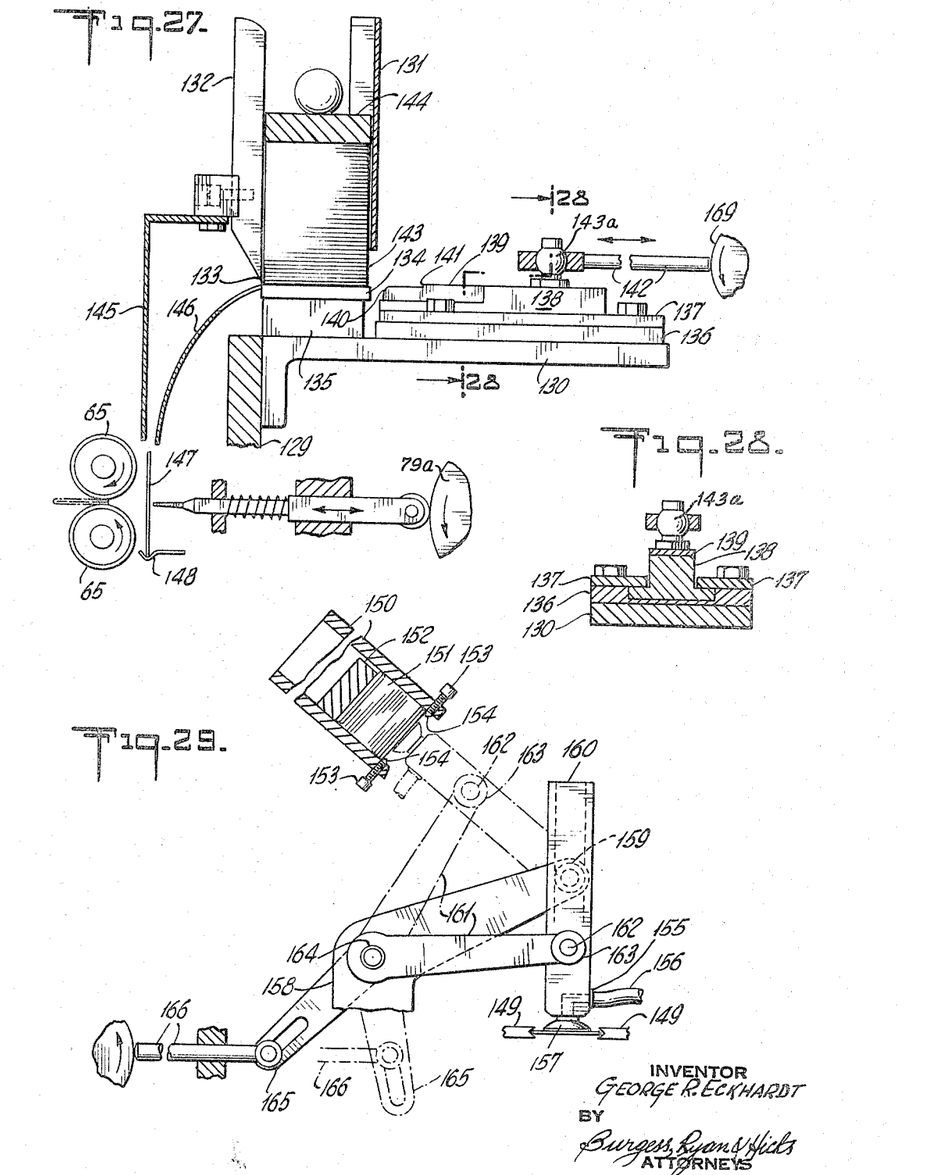
FIG. 27 is a cross-sectional view corresponding to FIG. 9 showing an alternate form of feed mechanism for insert cards.
FIG. 28 is a cross-sectional view on plane 28—28 of FIG. 27.
FIG. 29 is a cross-sectional view corresponding to FIG. 15 showing an alternate form of insert card feed mechanism.

FIG. 27 illustrates an alternative mechanism for feeding folded insert cards to the machine. Machine frame 129 bears horizontal bracket 130. On the bracket is mounted an insert card magazine comprised of vertical corner guides 131 and vertical feed guides 132. The feed guides have a bottom edge 133 which serves to prevent the feeding of more than one insert card at a time, as will be explained below.

A stack of insert cards 143 rests within the insert card magazine on support plate 134. An insert card advancing mechanism is supported by the bracket 130. The bracket bears a slideway 136. Cap plates 137 are bolted to the slideway and define with the slideway an undercut slot of T-shaped cross-section, as seen in FIG. 28. Mounted for reciprocation in this slot is slide 138. An insert 139 in the leading end of the slide has a rounded leading edge 140 and a feed ledge 141 projecting upward from its top surface. The slide is connected to a pushrod 142 by means of ball-and-socket joint 143a. The pushrod is activated by a cam 169 each time the operator of the machine depresses the control pedal. The slide is shown in FIG. 27 in its at-rest position. When the pushrod is activated the slide reciprocates to the left and then back to the at-rest position. The feed ledge strikes the bottom insert card in the stack during this motion and drives it out from under the stack to the left. The bottom edges 133 of the feed guides are positioned so that they contact the edge of the second insert card from the bottom in the stack and prevent it from being moved by the slide. A follower weight 144 rides on the stack of insert cards and presses it downward.

When an insert card has been ejected from the stack it enters a chute comprised of outer wall 145 and curved inner wall 146. After sliding downward through this chute the insert card comes to rest in vertical position 147 with its lower edge in trough 148. From this position the card is folded in the same manner as has already been described in connection with the mechanism of FIG. 9.

FIG. 29 shows an alternative mechanism for placing empty envelopes between opener heads 149. A magazine 150 carries a stack 151 of envelopes compressed beneath a loose follower weight 152. The bottom of the magazine is open and the envelopes are retained therein by means of adjustable screws 153, each having a conical end 154. The conical ends protrude sufficiently so that the end envelope cannot fall from the magazine, yet it can be plucked past the conical ends as will be described below; the envelope material bending slightly to allow clearance.

At each end of the magazine, clear of the path of swing of the envelope as it is moved to the opener heads, there is a linkage like that shown in FIG. 29. These are connected by a hollow vacuum pipe 155, which is in turn connected to a vacuum valve (not shown) by a flexible plastic tube 156. Spaced along the vacuum pipe are three rubber suction cups 157. When the vacuum valve is opened, a partial vacuum in the cups is produced and causes them to adhere to an envelope, as will be more fully explained below.

The linkage has bracket 158 which is fixed with respect to the frame of the machine. The bracket carries a roller 159 on its outer end. The roller rides in a slot in track piece 160, the slot having a T-shaped cross-section. The slot and roller are on the far side of the track piece as seen in FIG. 29, and are shown by dashed lines. The track piece is joined to the end of swing arm 161 by a bearing comprised of a stud 162 protruding from the track piece and held in bearing 163 on the swing arm.

The swing arm is keyed to shaft 164 which passes through a bearing in bracket 158 and is keyed to crank 165 on the far side of the bracket. The crank is hinged to the end of pushrod 166, which is made to reciprocate axially by a cam 170. Reciprocation of the pushrod causes the linkage to move from the position shown in solid lines to that shown by dot-and-dash lines in FIG. 29. During this motion the bearing 163 first moves toward the roller 159 and then away therefrom, the roller sliding relative to the track piece 160 in the T-shaped slot thereof.

As may be seen in FIG. 29, the track piece moves between a second position (shown in dot-and-dash lines) and a first position (shown in solid lines). In the second position the suction cup is positioned to adhere to the bottom envelope on the stack, while in the first position it holds the envelope between the opener heads. The linkage shown is so constructed that when the suction cup is in either the first or the second position the track in the track piece is perpendicular to an imaginary line connecting the center of shaft 164 with the center of stud 162. This geometry insures that the suction cup will pluck the bottom envelope straight out from the stack of envelopes in a direction parallel to the side walls of magazine 150. It also insures that the envelope will be moved down between the opener heads 149 in a substantially vertical direction.

When the operator pushes the foot switch, initiating an operating cycle, the linkage moves from the first position shown in solid lines in FIG. 29 to the second position shown in dot-and-dash lines. While the suction cups contact the envelope on the bottom of the stack in the magazine the vacuum valve is opened and suction is applied. The linkage then reverses its movements as pushrod 166 moves to the left, and the new envelope is placed between the opener heads 149, replacing the one which has been filled and ejected during the period when the linkage was in motion. The opener heads then grasp the new envelope, and the suction is removed by closure of the vacuum control valve. This leaves a new envelope between the opener heads, ready to be filled at the next cycle of the machine.

When the machine is in use certain portions of the mechanism operate continuously. In the insert feed mechanism of FIGS. 9 and 27, the feed rollers 65 rotate continuously, as do rollers 62 in FIG. 9. These rollers may be geared to a small electric motor in any convenient manner. The remainder of the machine elements operate in cycles, each cycle being initiated when the operator depresses a foot switch. The foot switch is depressed by the operator after she has positioned a zipper above the insert card. Immediately a relay-operated air valve opens, actuating the wire stitch machines, each of which drives a staple through the zipper tape into the insert card. Depression of the switch also activates a "one revolution" clutch, which thereby connects a continuously rotating electric motor to a camshaft while the camshaft makes one revolution, after which the clutch disconnects. The camshaft operates the various sliding elements described above by means of pushrods and bell-crank linkages.

It will be understood that an individual insert card does not not advance all the way from the stack of cards in trough 58 to a waiting envelope during one cycle. Rather each insert card advances to a new station during each cycle. Thus, with each depression of the foot switch, the insert card in position 40" receives a zipper and is thrust into an envelope, the insert card in position 40' on the slide is advanced to position 40", the insert card resting on card support 63 is thrust between rollers 65 by feed knife 64, and a new card insert is stripped from the supply stack and delivered to card support 63 by rollers 62. The actions of the feed knife and the feed block 60 are so timed that the slide 69 is able to reciprocate and be back in place on time to receive the insert card emerging from rollers 65.

As each cycle begins an envlope is waiting between the opener heads 101. After the reciprocation of the slide 69 has filled this envelope the opener heads are opened, the filled envelope drops, and the envelope feed mechanism removes a new envelope from the supply stack and positions it between the opener heads.

The following is claimed:
1. A packaging machine for fastening a flat article to an insert card and inserting the article and insert card into an envelope, comprising:
   (a) means for storing a stack of insert cards;
   (b) means for removing one insert card from the stack of stored insert cards and delivering said one insert card to a slideway;
   (c) means for propelling the insert card along the slideway to a fastening station;
   (d) means for fastening a flat article to the insert card at the fastening station;
   (e) means for storing a stack of envelopes;
   (f) means for removing one envelope from the stack of stored envelopes and placing said one envelope at a filling station in alinement with the slideway, with an open end of the envelope facing the fastening station;
   (g) means for opening the envelope by moving the opposed edges of the envelope adjacent the open end thereof toward each other;
   (h) means for opening the envelope by directing an air blast into the open end of the envelope;
   (i) means for propelling an insert card with a flat article attached thereto from the fastening station into the open end of an opened envelope while said envelope is in the filling station; and
   (j) means for closing the flap of the envelope after the insert card has been positioned therein.

2. The machine of claim 1 in which the means for removing one insert card from the stack of stored insert cards and delivering said one insert card to a slideway comprises means for folding said one insert card along a fold line parallel to the direction of advance of the insert card when said insert card is moved into the envelope.

3. The machine of claim 1 in which the means for closing the flap of the envelope after the insert card has been positioned therein comprises means for temporarily separating a corner of the envelope body from the adjacent portions of the envelope and means for tucking a corner of the envelope flap between the corner of the envelope body and the adjacent portions of the envelope while the corner of the envelope body is separated from the adjacent portions of the envelope.

4. A cyclically operable packaging machine for fastening a flat article to an insert card and inserting the article and insert card into an envelope comprising:
   (a) a magazine for holding a supply of insert cards;
   (b) an ejector adapted to remove one card from the magazine at each cycle of the machine and deliver said card to a position adjacent a pair of counter-rotating rollers;
   (c) a feed knife movable against a desired fold line on the insert card to thrust said insert card, fold line first, between the counter-rotating rollers;
   (d) a slide positioned to receive the folded insert card from the rollers when in a first position, said slide being movable with the insert card so received from the first position to a second position;
   (e) a fastening device at the second position adapted to fasten a flat article to an insert card when said insert card is in the second position;
   (f) a pawl attached to the slide adapted, when the slide moves from the first to the second position, to contact an insert card when said insert card is in the second position and to move said insert card from the second position to an envelope filling station;
   (g) an envelope magazine for holding a supply of envelopes;
   (h) a transport mechanism adapted to remove an envelope from the envelope magazine and move it to the envelope filling station;
   (i) envelope grippers at the filling station adapted to squeeze the opposed side edges of the envelope toward each other and thereby open the envelope;

(j) an air nozzle adapted to direct a blast of air into the mouth of an envelope when the envelope is in the filling station, thereby helping to open said envelope;

(k) a guide plate adjacent the envelope filling station adapted to guide an insert card into the mouth of an envelope when said envelope is in the filling station as said insert card is moved from the second position to the envelope filling station by the pawl.

5. A packaging machine for stapling a zipper to a folded insert card, inserting the zipper and insert card into an open ended envelope, and closing the open end of the envelope by tucking a flap thereof, said machine comprising:

(a) means for positioning an insert card in a feeding position adjacent a pair of counter-rotating rollers with the midline of the insert opposite the intake gap between the rollers;

(b) a feed knife located on the opposite side of the insert card from the rollers when an insert card is in the feeding position, said feed knife being reciprocable toward the gap between the counter-rotating rollers to buckle the insert card along the midline thereof and thrust the insert card midline first between the rollers;

(c) a slideway on the opposite side of the rollers from the feed knife positioned to receive a folded insert card emerging from the rollers;

(d) a slide in the slideway positioned, when in a first position, to receive on its top surface a folded insert card emerging from the rollers, said slide being reciprocable along the slideway to a second position;

(e) a slide ledge projecting upward from the top surface of the slide, located to contact the trailing edge of an insert card in the slideway and propel the insert card along the slideway to a stapling position, which is reached when the slide reaches the second position;

(f) a lower guide plate in the path of a card insert moving with the slide;

(g) an upper guide plate above the lower guide plate and spaced therefrom, the upper and lower guide plates forming between them a channel positioned to receive and guide a card insert as the card insert is moved along the slideway to the stapling position;

(h) means resiliently biasing the upper and lower guide plates toward each other to adapt said guide plates for resiliently grasping a card insert between them;

(i) a grooved guide block positioned to receive in its groove an edge of an insert card when said insert card is in the stapling position;

(j) a tabletop alined with the groove in the guide block and positioned to be coplanar with the top surface of an insert card when said insert is in stapling position;

(k) a stapling device positioned to staple together an insert card in the stapling position and a zipper resting on said insert card;

(l) a pawl on the slide movable between a raised and a lowered position, the pawl being yieldably biased toward the raised position, said pawl having a front face projecting above the top surface of the slide when the pawl is in the raised position, the front face being positioned to contact the trailing edge of an insert card in stapling position and propel the insert card out of the stapling position through a guide frame when the slide moves from the first to the second position;

(m) a guide frame positioned to receive an insert card when said insert card is pushed from the stapling position by the pawl, said guide frame having an upper guide plate positioned to guide the upper surface of the zipper as the insert card advances through the guide frame;

(n) means for positioning an open-ended envelope in a filling station with the open end in alinement with the path of an insert card through the guide frame;

(o) an opener head positioned beside the envelope when said envelope is in the filling station, said opener head being movable to squeeze open the mouth of the envelope; and (p) an air nozzle located to direct a stream of air into the mouth of an opened envelope in the filling station.

6. The machine of claim 5, wherein the means for positioning an insert card in a feeding position adjacent a pair of counter-rotating rollers comprises:

(q) an insert card magazine having an open end, said magazine constructed to retain a stack of insert cards;

(r) an ejector slide movable across the open end of the insert card magazine, said ejector slide having a ledge positioned to strip an insert card from the end of the stack of insert cards upon motion of the ejector slide; and (s) counter-rotating rollers positioned to seize an insert card stripped from the stack by the ejector slide and to advance said insert card to the feeding position.

7. The machine of claim 5 wherein the means for positioning an insert card in a feeding position adjacent a pair of counter-rotating rollers comprises:

(q) an insert card magazine having an open end, said magazine being constructed to retain a stack of insert cards;

(r) an ejector slide movable across the open end of the insert card magazine, said ejector slide having a ledge positioned to strip an insert card from the end of the stack of insert cards upon motion of the ejector slide; and (s) a chute positioned to receive the insert card stripped from the stack by the ejector slide and deliver said insert card into the feeding position.

8. The machine of claim 5, wherein the means for positioning an open-ended envelope in the filling station comprises:

(q) an envelope magazine open at the bottom formed to hold a stack of envelopes;

(r) a table having a top surface extending beneath the envelope magazine and positioned to support a stack of envelopes in said magazine from below;

(s) a lip on the envelope magazine raised above the top surface of the table and defining therewith an exit slit positioned to allow sideways advance of the lowermost envelope in the stack; and (t) a reciprocable envelope advancing plate movable across the bottom of the envelope magazine and positioned to push the lowermost envelope in the stack out through the exit when so moved.

9. The machine of claim 5 wherein the means for positioning an open-ended envelope in the filling station comprises:

(q) an open-ended magazine shaped to support a stack of envelopes, with the bottom envelope in the stack exposed through the open end of the magazine;

(r) a vacuum pipe movable by linkage means between a first position adjacent the open end of the magazine and a second position adjacent the filling station;

(s) a suction cup on the vacuum pipe positioned to abut a bottom enevlope in the stack when the vacuum pipe is in the first position and to adhere thereto when a vacuum is created in the vacuum pipe, said suction cup being positioned so that an envelope adhered thereto is in the filling station when the vacuum pipe is in the second position; and (t) vacuum means for creating a suction in the suction pipe as the pipe moves from the first to the second position.

10. The machine of claim 9 wherein the linkage means comprises:

(u) a roller having an axis fixed with respect to the machine frame; surfaces defining a longitudinal track in which the roller is located, said track piece bearing the vacuum pipe at one end thereof;

(w) a swing arm pivotally attached to the track piece intermediate the vacuum pipe and the segment of track in which the roller rides, said swing arm being pivoted to the machine frame at a swing arm axis, said swing arm axis being located so that an imaginary line from the swing arm axis to the point at which the swing arm and track piece are pivotally attached is perpendicular to the track when the track piece is in both the first position and the second position; and (x) means for moving the swing arm about the swing arm axis to move the vacuum pipe between the first and second positions.

11. A mechanism for closing the mouth flap on a substantially flat filled envelope, said envelope having an open end, a mouth flap attached to one face of the envelope along the side of said face at the open end in a fold line, an overlap seam running down the other face of the envelope away from the open end, and a free corner of the seam, said mechanism comprising:

(a) means for holding the filled envelope in an envelope position:

(b) a flap tucker;

(c) means for moving the flap tucker in a flap-bending motion from a first position in which the flap tucker is clear of the envelope position to a second position, said flap-bending motion having a velocity component perpendicular to the plane defined by an envelope when said envelope is in the envelope position;

(d) means for moving the flap tucker in a flap-tucking motion from the second position to a third position, said flap-tucking motion having a velocity component parallel to the plane defined by an envelope when said envelope is in the envelope position and said velocity component being directed toward the envelope position;

(e) a surface on the flap tucker formed and located to contact the mouth flap of an envelope when said envelope is in the envelope position and to bend the mouth flap across the mouth of said envelope along the fold line as the flap tucker goes through the flap-bending motion;

(f) sufraces on the flap tucker defining a notch, said notch extending inward in a plane parallel to the plane defined by an envelope when said envelope is in the envelope position and said notch being so located that, when the flap tucker moves in the flap-tucking motion, the mouth flap of an envelope in the envelope position is doubled back over the mouth of said envelope along the fold line and portions of the mouth flap and envelope enter the notch, the fold line entering first;

(g) guide surface on the flap tucker formed and located to contact the fold line of an envelope in the envelope position and to guide the fold line of said envelope into the notch as the flap tucker moves in the uap-tucking motion;

(h) a spreading finger;

(i) means for moving the spreading finger between an inactive position and an extended position, the spreading finger being so located that, when an envelope is in the envelope position, movement of the spreading finger from the inactive position to the extended position brings the end of the spreading finger between the body of the envelope and the free corner of the seam, separating them and allowing the mouth flap to be folded into position between them by the action of the flap tucker.

No references cited.

GRANVILLE Y. CUSTER, JR., *Primary Examiner.*